United States Patent
El-Azzami et al.

(10) Patent No.: US 11,706,302 B1
(45) Date of Patent: Jul. 18, 2023

(54) EFFICIENT TOPICS IN TRANSPORT PROTOCOLS

(71) Applicant: Dell Products L.P., Round Rock, TX (US)

(72) Inventors: Bassem El-Azzami, Austin, TX (US); Abeye Teshome, Austin, TX (US); Srikanth Kondapi, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/832,077

(22) Filed: Jun. 3, 2022

(51) Int. Cl.
*H04L 67/141* (2022.01)
*H04L 67/10* (2022.01)
*H04L 67/143* (2022.01)

(52) U.S. Cl.
CPC ............ *H04L 67/141* (2013.01); *H04L 67/10* (2013.01); *H04L 67/143* (2013.01)

(58) Field of Classification Search
None
See application file for complete search history.

(56) References Cited

U.S. PATENT DOCUMENTS

| | | | | |
|---|---|---|---|---|
| 7,958,262 | B2 * | 6/2011 | Hasha | H04L 61/4535 709/225 |
| 8,090,880 | B2 * | 1/2012 | Hasha | G06F 16/273 709/224 |
| 8,095,601 | B2 * | 1/2012 | Hasha | H04L 67/51 709/217 |
| 2009/0319684 | A1 * | 12/2009 | Kakivaya | H04L 12/42 709/238 |
| 2010/0262717 | A1 * | 10/2010 | Critchley | H04L 67/1065 709/251 |
| 2023/0024819 | A1 * | 1/2023 | Tesse | G06F 16/24552 |

\* cited by examiner

*Primary Examiner* — Quang N Nguyen
(74) *Attorney, Agent, or Firm* — Kirton McConkie; Brian Tucker

(57) ABSTRACT

Messages can be exchanged using efficient topics. When a server is interconnected with endpoints via a broker that implements a topic-based transport protocol, the server can dynamically generate a response ID for a request message the server intends to send to an endpoint. The server can generate the response ID from an endpoint ID of the endpoint and a message ID for the request message. The server can include the endpoint ID and the message ID in the request message and can subscribe to a topic containing the response ID. Upon receiving the request message, the endpoint can extract the endpoint ID and the message ID and use them to generate the response ID. The endpoint can then send a response message that includes the topic containing the response ID. Alternatively, the response ID could be generated from a message ID and a pre-agreed upon unique ID.

15 Claims, 11 Drawing Sheets

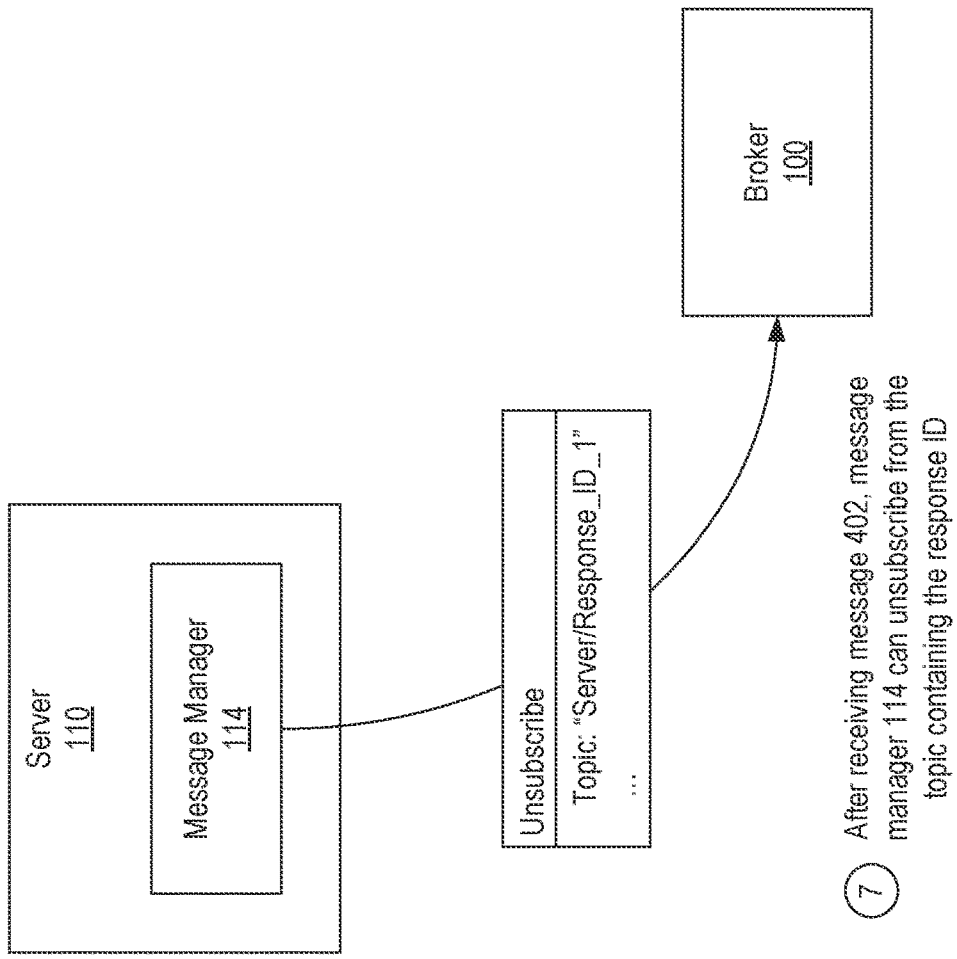

EFFICIENT TOPICS IN TRANSPORT PROTOCOLS

CROSS-REFERENCE TO RELATED APPLICATIONS

N/A

BACKGROUND

Some transport protocols use topics to identify messages that may be exchanged. For example, the Message Queue Telemetry Transport (MQTT) protocol, which has become the most common protocol for the internet-of-things (IOT), allows publishing clients to use topics to identify messages they publish and subscribing clients to use such topics to subscribe to receive the messages. This publishing and subscribing are performed via a broker.

In MQTT and similar transport protocols, topics are encoded strings that define a hierarchy of information using the forward slash to separate levels of the hierarchy. As an example, a topic of "sensor/temperature/bedroom" could be used to identify messages pertaining to the temperature reported by a sensor in the bedroom. Subscribers could then use this topic to receive such messages.

Topics can oftentimes be relatively large, particularly when a server and endpoints transmit requests and responses using the transport protocol. For example, a topic for a request may be defined using a unique identifier of the endpoint to which the request is targeted, a unique identifier for the request, and various additional levels specific to a service or component on the end point. In such a case, the unique identifiers of the publishing client and the request could be 64 characters (32 bytes) and 32 characters (16 bytes) respectively. With the characters for the additional levels, a single topic may routinely exceed 100 characters. This can create various difficulties, particularly for clients with limited resources.

In a scenario where a client may support 100 topics/requests, each of which is 100+ characters in length, the client would need to allocate a large section of memory for handling the topics (e.g., 10 KB). This may be excessive for a microcontroller or other resource-constrained client. Also, the client would need to be able to perform string comparisons to detect all 100 topics. The computing power to perform such comparisons could be excessive for a resource-constrained client. The length of the topics would also cause lengthier data transfers. If the requests are passed over a constrained interface, such as an I2C interface when the messages are handled by an embedded controller, there may be excessive latency. Furthermore, topics are transmitted in plain text and therefore any sensitive information contained in the topics is susceptible to interception. Accordingly, traditional techniques for leveraging topics to send requests and responses are inadequate in many scenarios.

BRIEF SUMMARY

The present invention extends to systems, methods, and computer program products for exchanging messages using efficient topics. When a server is interconnected with endpoints via a broker that implements a topic-based transport protocol, the server can dynamically generate a response ID for a request message the server intends to send to an endpoint. The server can generate the response ID from an endpoint ID of the endpoint and a message ID for the request message. The server can include the endpoint ID and the message ID in the request message and can subscribe to a topic containing the response ID. Upon receiving the request message, the endpoint can extract the endpoint ID and the message ID and use them to generate the response ID. The endpoint can then send a response message that includes the topic containing the response ID. Alternatively, the response ID could be generated from a message ID and a pre-agreed upon unique ID.

In some embodiments, the present invention may be implemented as a method for exchanging messages using efficient topics. An endpoint may receive a request message that includes a topic containing an endpoint identifier for the endpoint. The request message may also include a message ID for the request message. The endpoint may generate a response ID from the endpoint ID and the message ID. The endpoint may then publish a response message that includes a topic containing the response ID.

In some embodiments, the present invention may be implemented as a method for exchanging messages using efficient topics. A server may obtain an endpoint ID of an endpoint and a message ID for a request message to be sent to the endpoint. The server may generate a response ID from the endpoint ID and the message ID. The server may generate the request message. The request message may include a topic containing the endpoint ID. The request message may also include the message ID. The server may then publish the request message. The server may also subscribe to a topic containing the response ID.

In some embodiments, the present invention may be implemented as a computing system that includes a server and a plurality of endpoints. In response to publishing request messages intended for the plurality of endpoints, the server is configured to subscribe to topics containing response IDs that are generated from message IDs. In response to receiving the request messages, the plurality of endpoints are configured to publish response messages including the topics containing the responses IDs.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIGS. 4A-4G provide an example of how messages can be exchanged using efficient topics.

DETAILED DESCRIPTION

In this specification, embodiments of the present invention are described in the context of the MQTT protocol. However, embodiments of the present invention extend to scenarios where other topic-based transport protocols are implemented. The term "client" is used to represent any computing device that uses a topic-based transport protocol to communicate with other client(s) via a broker. The term "broker" represents an intermediary that enables such clients to communicate by receiving messages published by clients, filtering the messages by topic, and distributing the messages to clients that subscribe to the topics.

Figure 1:
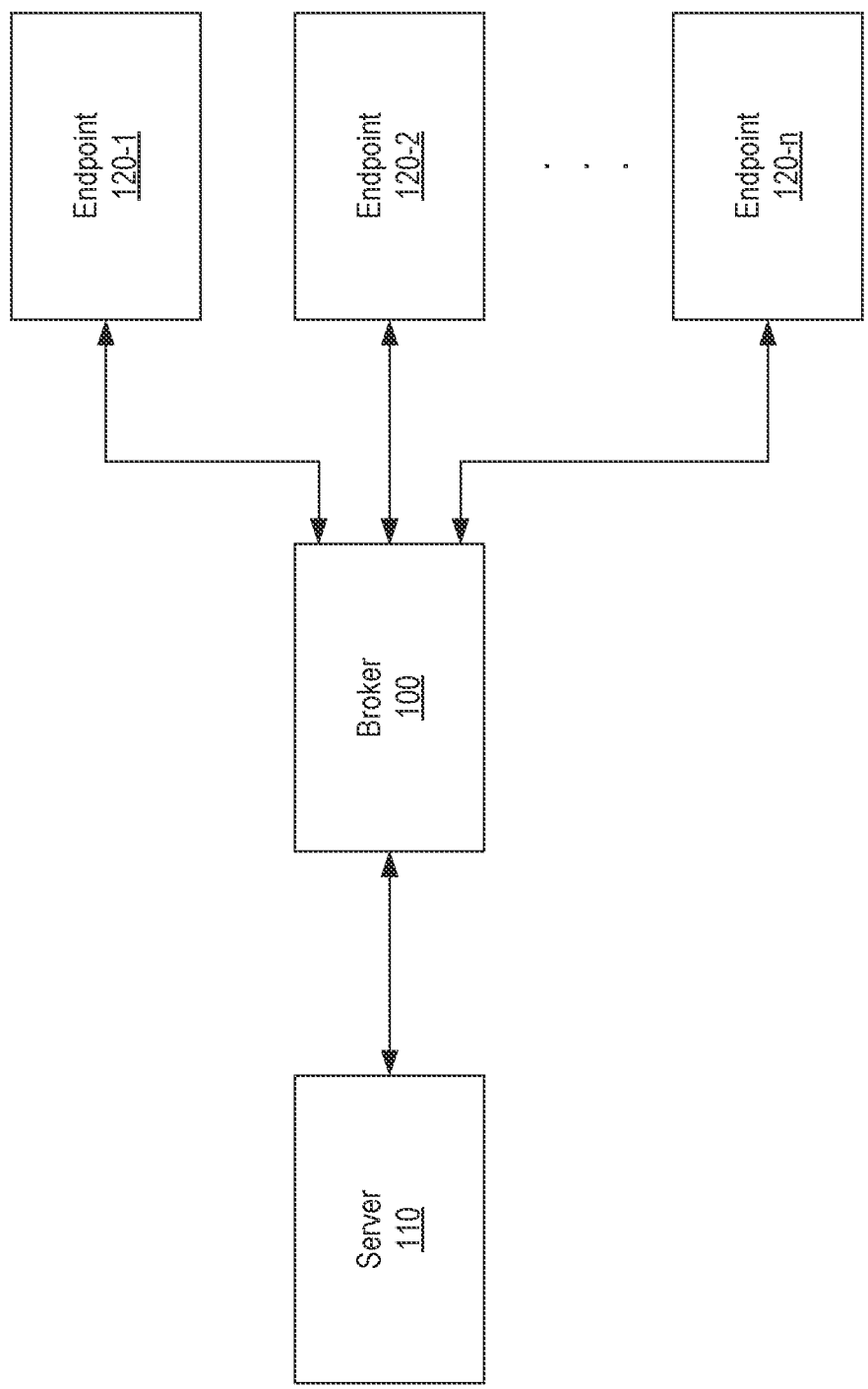
FIG. 1 provides an example of a computing environment in which embodiments of the present invention may be implemented.

FIG. 1 provides an example of a computing environment in which embodiments of the present invention may be implemented. The computing environment includes a broker 100 that is configured to implement a topic-based transport protocol such as MQTT, a server (or servers) 110, and endpoints 120-1 through 120-n (collectively endpoints 120). Server 110 and endpoints 120 are all clients in the topic-based transport protocol network. In other words, server 110 and endpoints 120 intercommunicate via broker 100 using a topic-based transport protocol.

Figure 2:
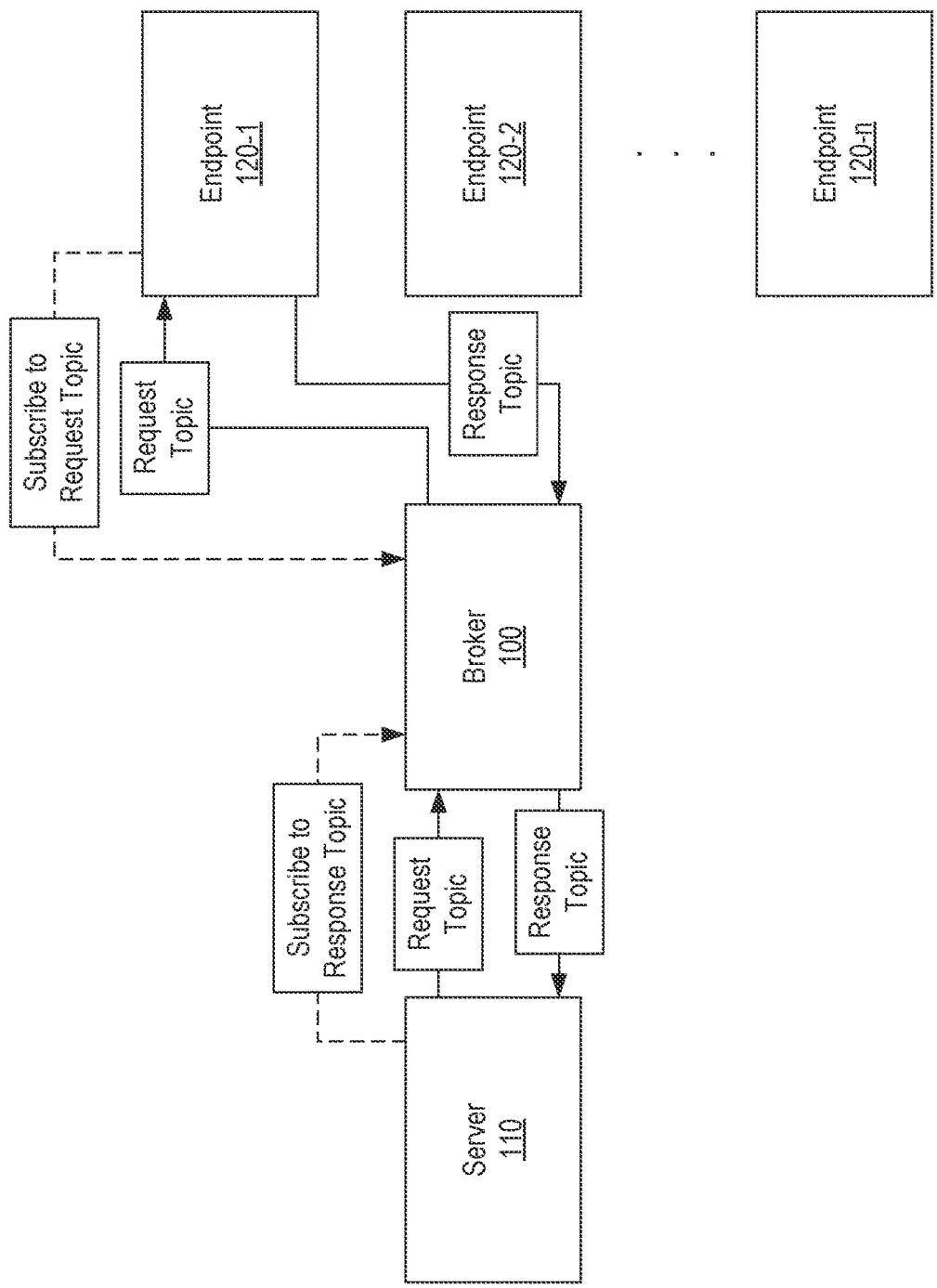
FIG. 2 provides an example of how a server and endpoints may intercommunicate using a topic-based transport protocol.

FIG. 2 provides a general example of how server 110 and endpoints 120 may intercommunicate via broker 100 using the topic-based transport protocol. In this example, endpoint 120-1 is shown as subscribing to a request topic that server 110 may provide. For example, this request topic could be a topic pertaining to endpoint 120-1 (e.g., a topic that includes an identifier of endpoint 120-1). Server 110 is also shown as sending a message that has the request topic. Because of endpoint 120-1's subscription, broker 100 distributes the message to endpoint 120-1. In conjunction with sending the message, server 110 can subscribe to a corresponding response topic. Also, in response to receiving the message, endpoint 120-1 can generate and send a message having the response topic. Due to server 110's subscription, broker 100 will distribute the message to server 110. In this way, server 110 can request and receive information from any of endpoints 120.

Embodiments of the present invention are directed to the use of efficient topics to perform the type of messaging represented in FIG. 2. More specifically, when embodiments of the present invention are implemented, topics used to exchange messages between server 110 and endpoints 120 can be dynamically generated to reduce the size of the topics and the computational resources needed to process the messages.

Figure 3:
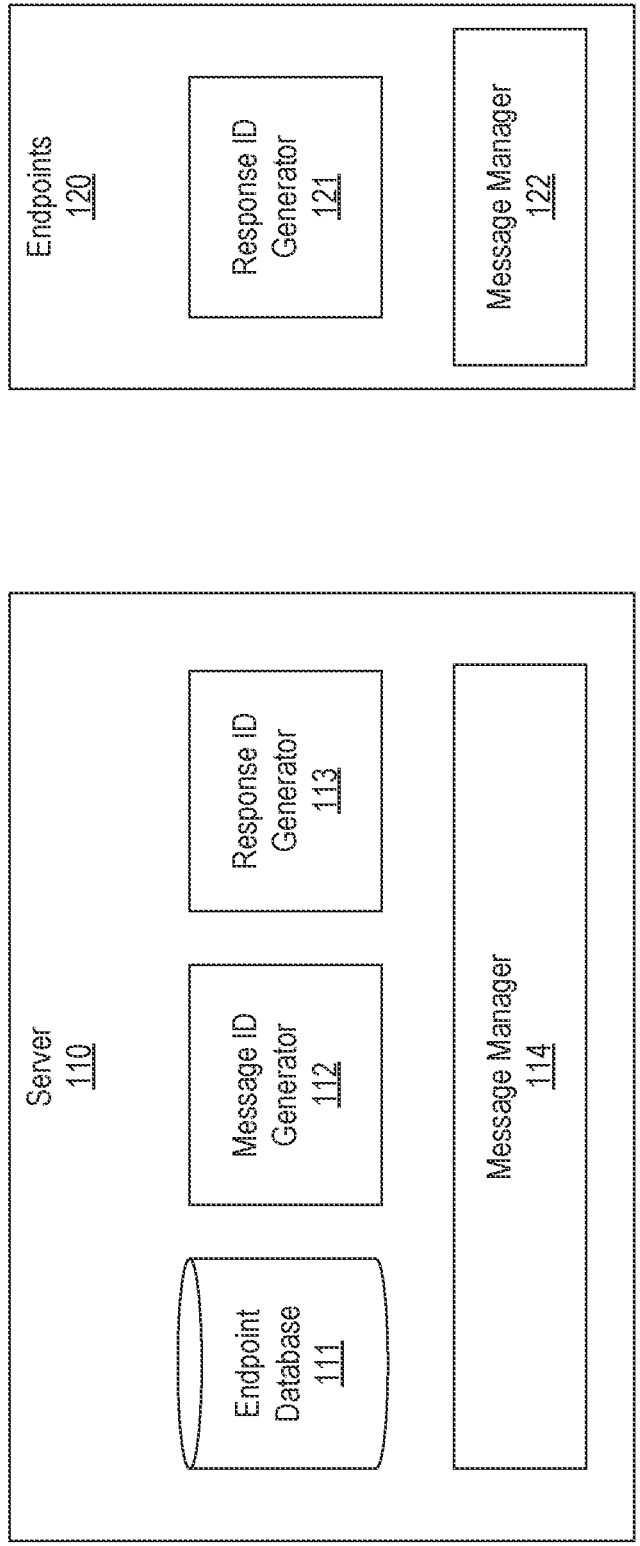
FIG. 3 provides an example of various components/functionality that may be included on a server and endpoints to enable one or more embodiments of the present invention to be implemented.

FIG. 3 provides an example of components that could be included on server 110 and endpoints 120 in one or more embodiments of the present invention. Server 110 may include an endpoint database 111 in which server 110 maintains information about endpoints 120 such as a unique identifier for each endpoint (or "endpoint ID"). Server 110 may also include a message ID generator 112 which can represent one or more components that are configured to generate unique message IDs for messages that server 110 sends to endpoints 120. Server 110 may further include a response ID generator 113 which can represent one or more components that are configured to generate a response ID that corresponds with a request that server 110 is sending. As described in greater detail below, response IDs can be used to make the topics of requests and responses more efficient.

In some embodiments, response ID generator 113 can dynamically generate a response ID based on a message ID of a message server 110 is sending and an endpoint ID of the endpoint to which the message is sent. Server 110 may additionally include a message manager 114 which can represent one or more components that are configured to generate and send messages/requests and to receive and process messages/responses. FIG. 3 also shows that each of endpoints 120 may include a response ID generator 121 and a message manager 122 which can function in a generally similar manner as their counterparts on server 110.

Figure 4A:
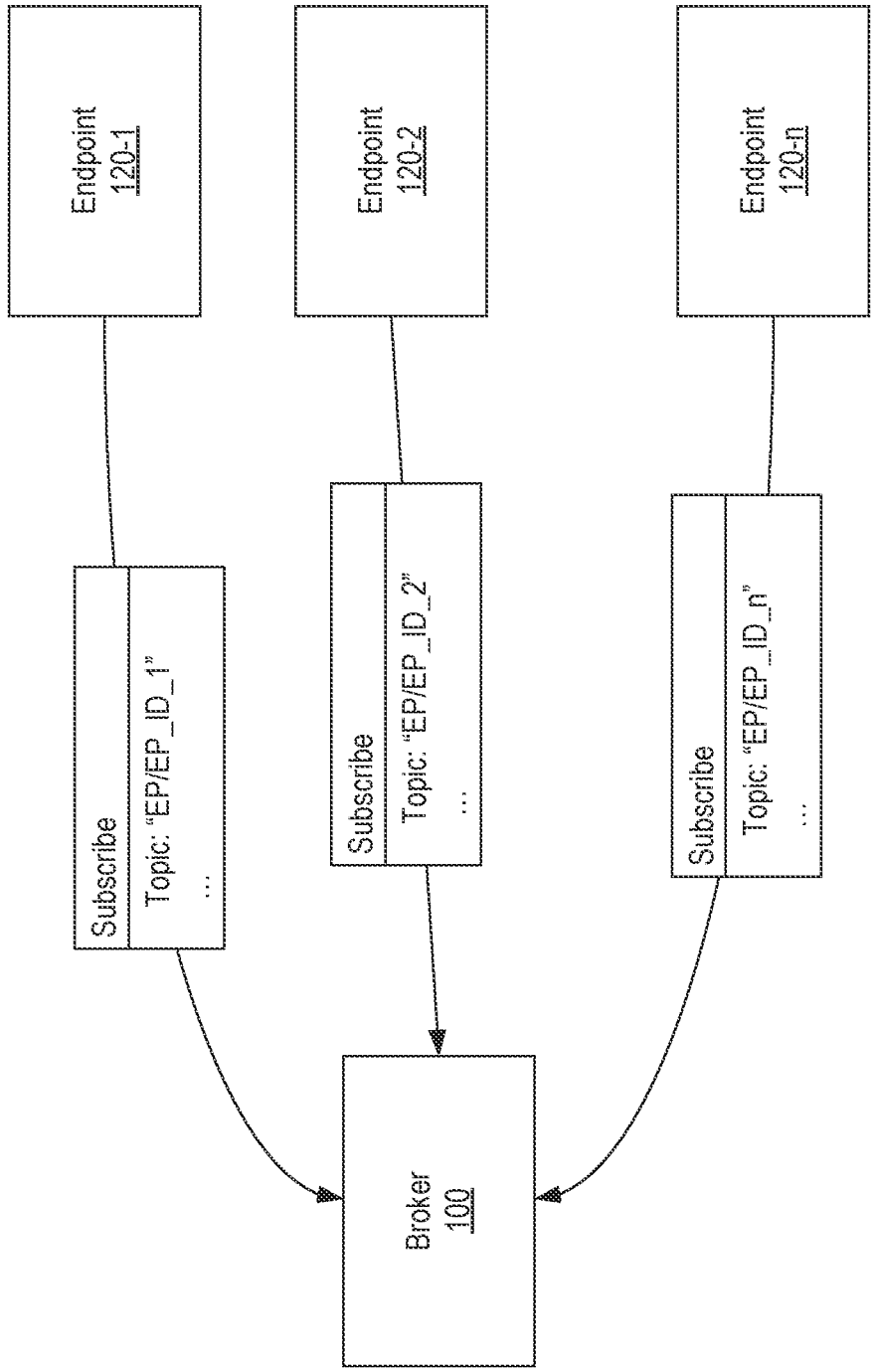

FIGS. 4A-4G provide an example of how messages can be exchanged using efficient topics in accordance with one or more embodiments of the present invention. Turning to FIG. 4A, in step 1, it is assumed that each endpoint 120 subscribes to one or more topics that pertain to itself and may do so as part of startup or other initialization. In this example, it is assumed that messages that target endpoints 120 (or requests) employ topics having "EP" at the first level of the hierarchy and the endpoint ID at the second level of the hierarchy. It is also assumed that endpoints 120 have endpoint IDs of EP_ID_1, EP_ID_2, . . . EP_ID_n. Accordingly, a topic pertaining to endpoint 120-1 would be "EP/EP_ID_1."

Figure 4B:
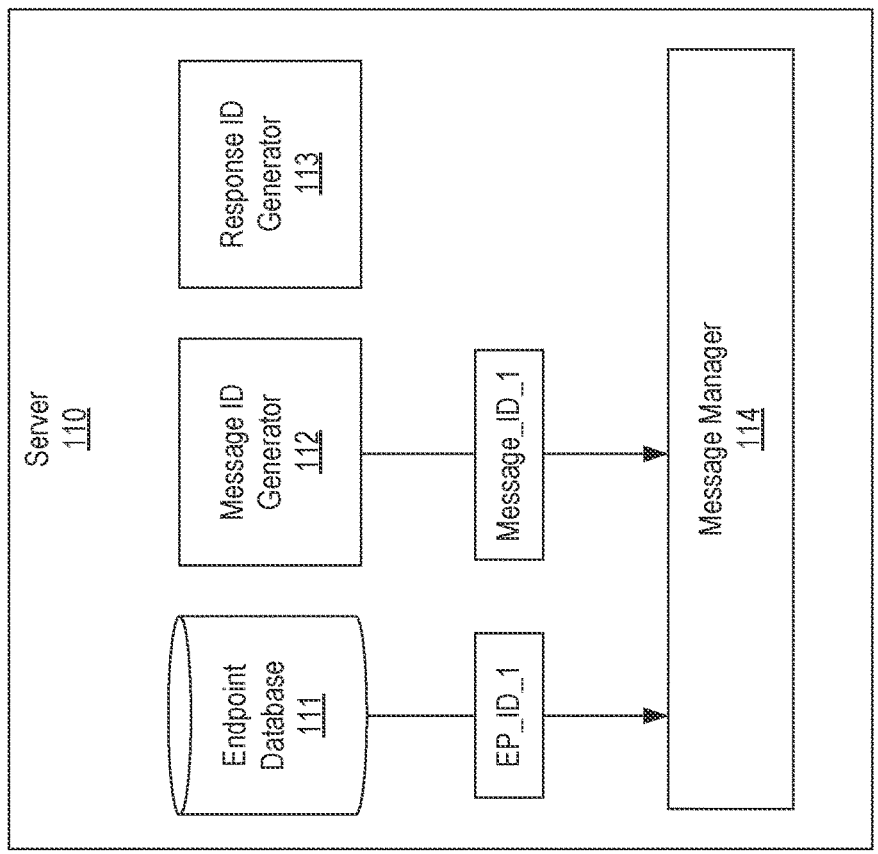

Turning to FIG. 4B, it is assumed that message manager 114 (or another component) on server 110 has determined that a request should be sent to endpoint 120-1. For example, server 110 could periodically send requests to endpoints 120 to obtain status information, performance information, or any other type of information. In step 2, and in conjunction with determining that a request should be sent to endpoint 120-1, message manager 114 can obtain the endpoint ID for endpoint 120-1 (EP_ID_1) from endpoint database 111 and can obtain a message ID (message_ID_1) from message ID generator 112.

Figure 4C:
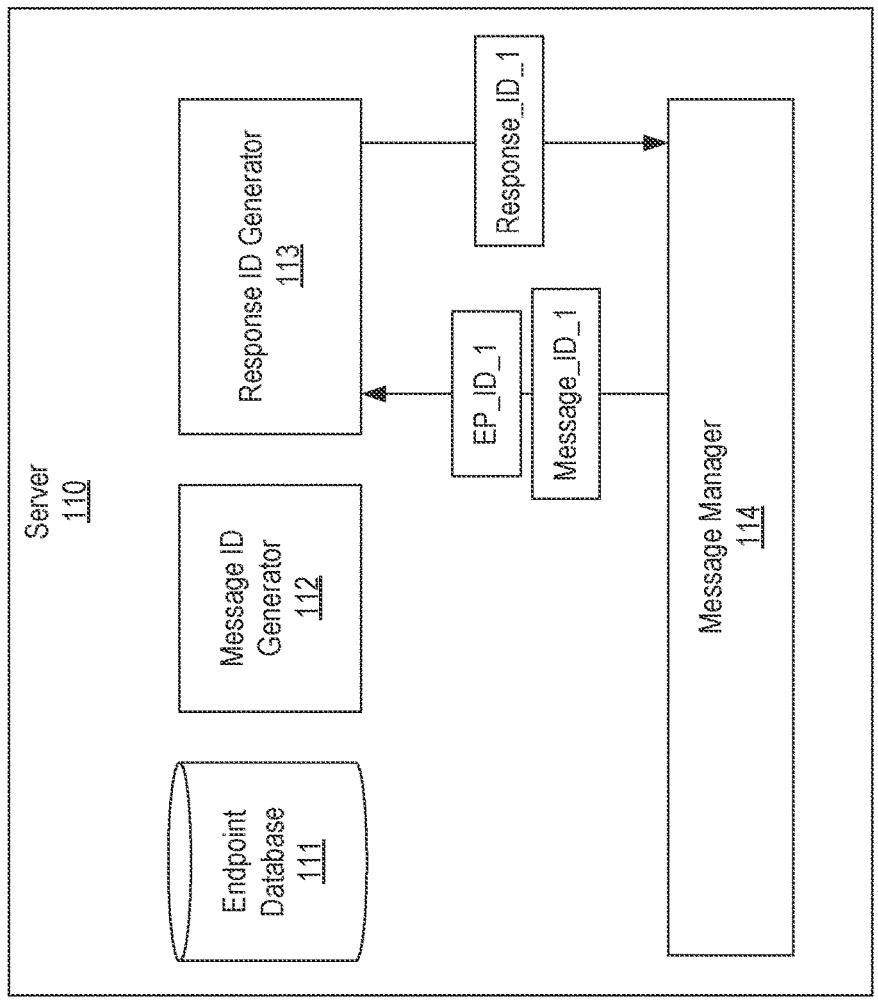

Turning to FIG. 4C, message manager 114 can use the endpoint ID (EP_ID_1) for endpoint 120-1 and the message ID (message_ID_1) to obtain a response ID (Response_ID_1) from response ID generator 113. For example, in some embodiments, response ID generator 113 could use the endpoint ID and the message ID as inputs to a one-way function with a fixed output size (e.g., the SHA256, SHA384, or SHA512 hash functions) to thereby dynamically generate the response ID. In some embodiments, and as further described below, message manager 114 could store the response ID in association with the endpoint ID and/or the message ID to facilitate processing of subsequently received response data.

Figure 4D:
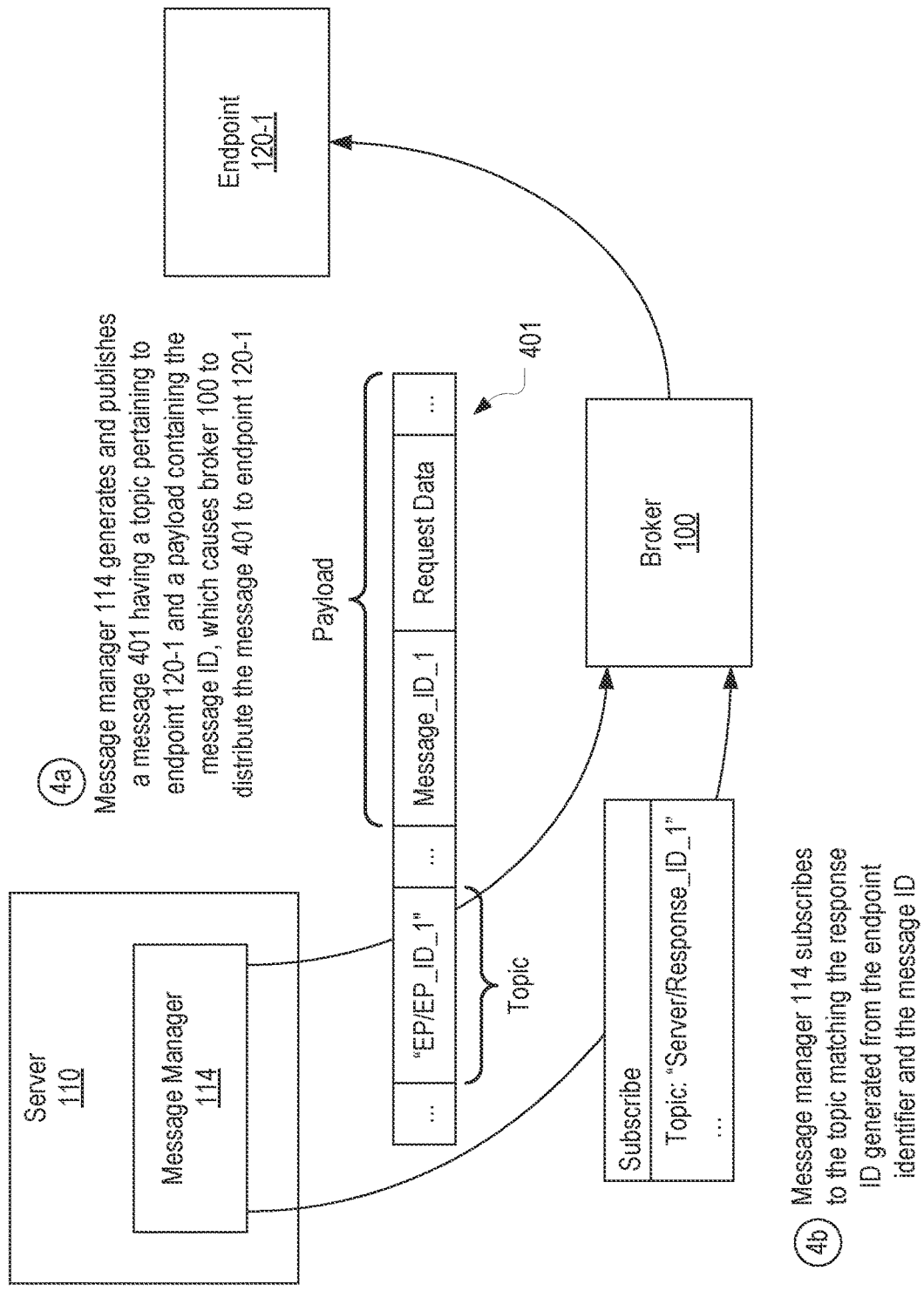

Turning to FIG. 4D, in step 4a, message manager 114 can generate and publish a message 401 having a topic pertaining to endpoint 120-1 (e.g., containing the endpoint ID of endpoint 120-1) and a payload containing the message ID and any request data. In this example, the topic would be "EP/EP_ID_1" based on the assumption that EP_ID_1 is the endpoint ID of endpoint 120-1. Because endpoint 120-1 is subscribed to this topic, broker 100 will distribute message 401 to endpoint 120-1. In step 4b, message manager 114 can also subscribe to a topic matching the response ID (Response_ID_1) that was generated from the endpoint ID and the message ID for message 401. In this example, it is assumed that topics of messages targeting server 110 have "Server" at the first level of the hierarchy and the dynamically generated response ID at the second level of the hierarchy. Accordingly, server 110 subscribes to the topic "Server/Response_ID_1."

Figure 4E:
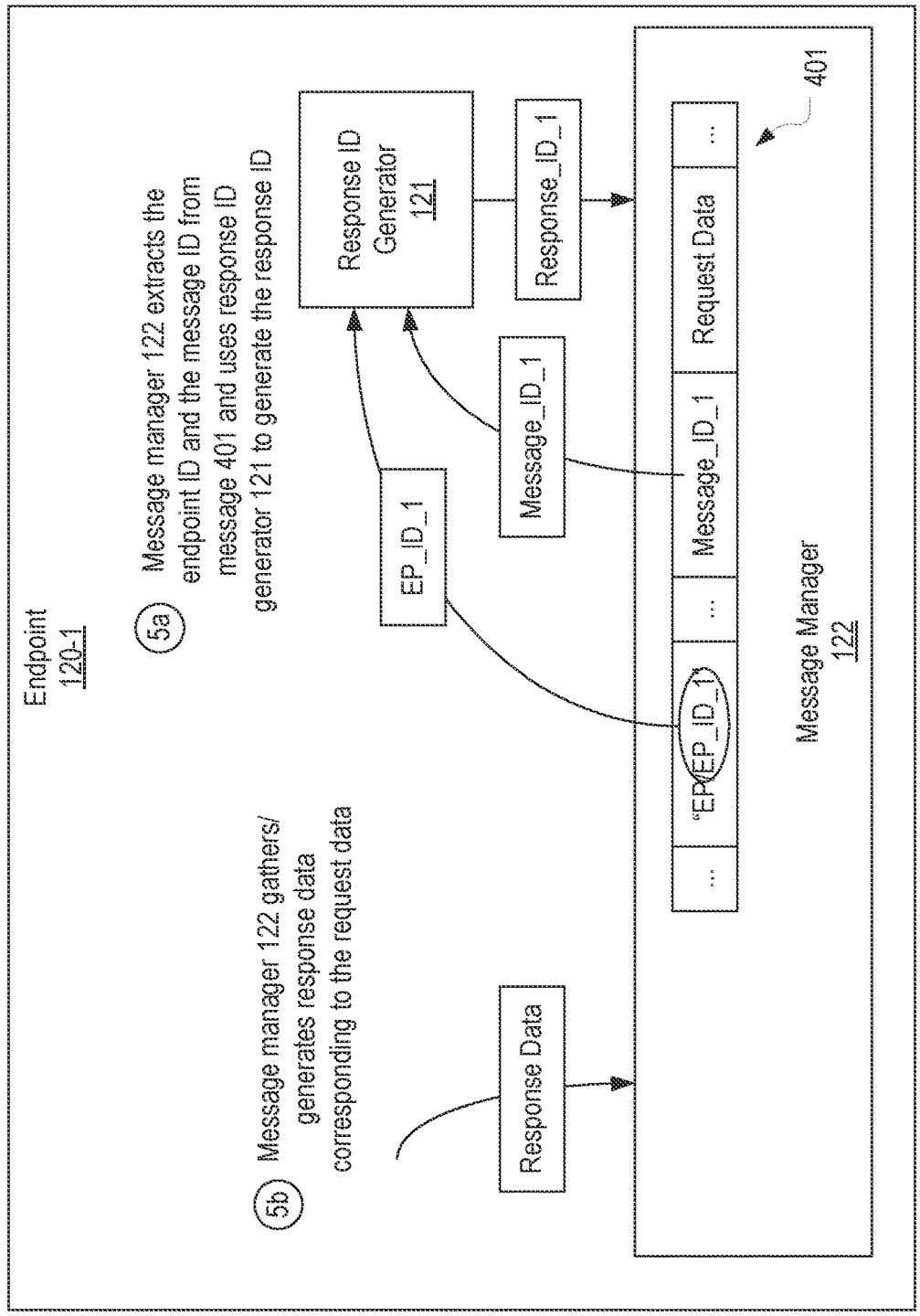

Turning to FIG. 4E, it is assumed that message manager 122 on endpoint 120-1 has received message 401 and is processing it. In step 5a, message manager 122 can extract the endpoint ID from the topic of message 401 and the message ID from the payload of message 401 and provide these IDs to response ID generator 121 to receive the response ID. Response ID generator 121 can use the same one-way function as response ID generator 113 so that the same endpoint ID and message ID inputs generate the same response ID on server 110 and the respective endpoint 120. In step 5b, message manager 112 can also gather/generate response data corresponding to the request data in message 401.

Figure 4F:
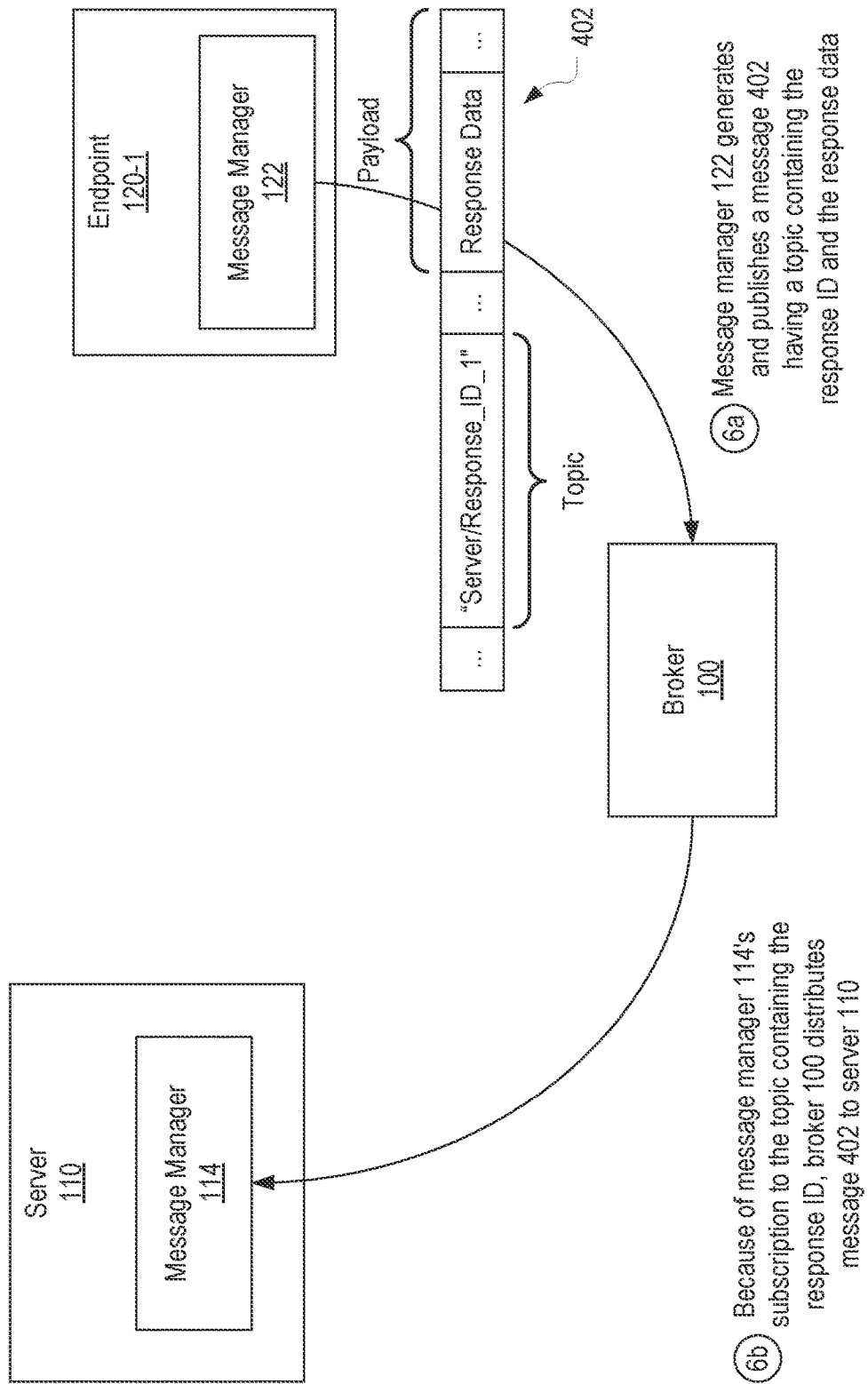

Turning to FIG. 4F, in step 6a, message manager 122 can generate and publish a message 402 (or response) that includes a topic containing the response ID and a payload containing the response data. In this example, given that message 402 targets server 110, the topic can include "Server" at the first level of the hierarchy such that the topic is "Server/Response_ID_1." Notably, the message ID need not be included in message 402. Also, because the response ID is dynamically generated and obfuscates the identity of the publishing endpoint 120, responses sent using the techniques of the present invention provide greater security. For example, the topic is sent in plain text which would allow any interceptor to read it. However, the response ID will be meaningless to an interceptor.

In step 6b, and because message manager 114 subscribed to the topic containing the response ID, broker 100 will distribute message 402 to server 110. Upon receiving message 402, message manager 114 could extract the response ID from the topic and use it to properly process the response data such as by using the response ID to obtain the endpoint ID to thereby associate the response data with endpoint 120-1.

Turning to FIG. 4G, after receiving message 402 with the topic containing the response ID, message manager 114 can unsubscribe from the topic. Accordingly, server 110 can only remain subscribed to a topic containing a response ID until it receives a response to its request for which the response ID was generated. This can facilitate scaling of the network.

In some embodiments, the response ID could be generated from a pre-agreed upon unique ID rather than from the endpoint ID. For example, each endpoint 120 could be configured to store and use a unique ID from which it can generate the response ID upon receiving a request message. Server 110 could also be configured to store and use these unique IDs to generate the response ID and subscribe to a topic containing the response ID when sending request messages to endpoints 120. In such embodiments, response ID generators 113 and 121 could use the message ID and the respective unique ID as inputs to a one-way function with a fixed output size to generate the response ID. By using a pre-agreed upon unique ID as opposed to the endpoint ID, endpoints 120 will not need to extract the endpoint ID from the request message to generate a response ID. This may simplify the message processing functionality on each endpoint 120.

Figure 5:
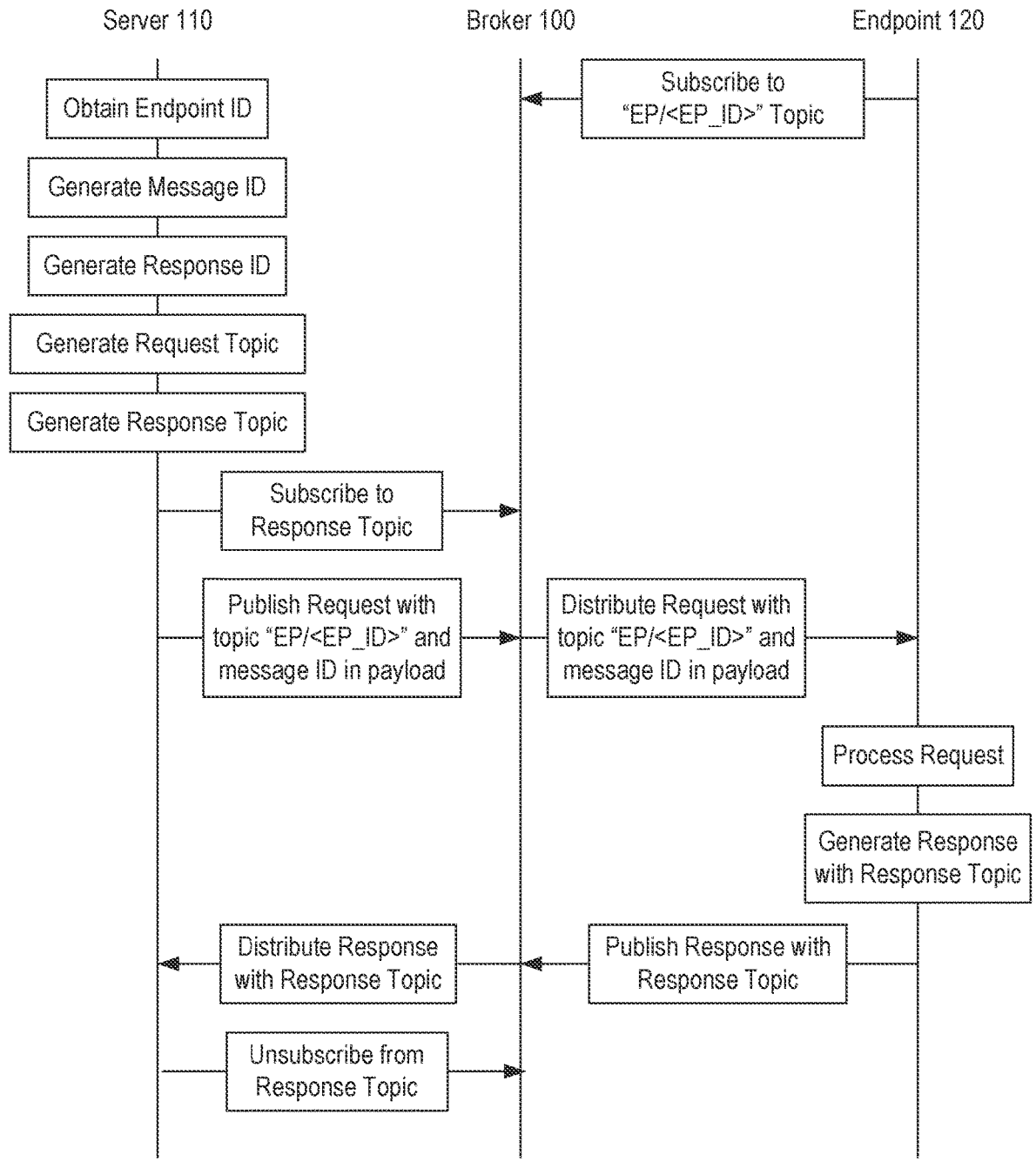
FIG. 5 is a flow diagram representing functionality that may be implemented in one or more embodiments of the present invention.

FIG. 5 is a flow diagram summarizing the above-described functionality. As shown, each endpoint 120 can subscribe to a topic containing its endpoint ID. When server 110 intends to send a message/request to an endpoint 120, it can obtain the endpoint ID, generate a message ID, generate a response ID from the endpoint ID and the message ID, generate a request topic that includes the endpoint ID, and generate a response topic that includes the response ID. Server 110 can then subscribe to the response topic and publish a request with a topic containing the endpoint ID and a payload containing the message ID. Broker 100 will then distribute the request to the respective endpoint 120. Endpoint 120 can process the request, generate a response having the response topic, and publish the response. Broker 100 will then distribute the response to server 110. Upon receiving the response, server 110 can unsubscribe from the response topic.

In summary, embodiments of the present invention enable efficient topics to be used to transfer requests and responses in a network that employs a topic-based transport protocol. The efficient topics can enhance the performance of limited resource clients such as microcontrollers or networked devices. The efficient topics can obfuscate sensitive information about the clients thereby adding security to the network. The efficient topics can also enable endpoint capabilities to be extended without impacting existing topics or topic structures.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for exchanging messages using efficient topics comprising:
   receiving, at an endpoint from a server, a request message that includes a topic containing an endpoint identifier for the endpoint, the request message also including a message ID for the request message;
   generating, by the endpoint, a response ID from the endpoint ID and the message ID;
   subscribing, by the server, to a topic containing the response ID;
   publishing, by the endpoint, a response message that includes the topic containing the response ID;
   receiving, by the server, the response message; and
   unsubscribing, by the server, from the topic containing the response ID.

2. The method of claim 1, wherein the message ID is contained in a payload of the request message.

3. The method of claim 1, wherein the response ID is generated from the endpoint ID and the message ID using a one-way function.

4. The method of claim 3, wherein the one-way function is a hash function.

5. The method of claim 1, wherein the request message includes request data, the method further comprising:
   generating response data corresponding to the request data; and
   including the response data in the response message.

6. The method of claim 1, wherein the server generates the response ID from the endpoint ID and the message ID.

7. A method for exchanging messages using efficient topics comprising:
   obtaining, by a server, an endpoint ID of an endpoint and a message ID for a request message to be sent to the endpoint;
   generating, by the server, a response ID from the endpoint ID and the message ID;
   generating, by the server, the request message, the request message including a topic containing the endpoint ID, the request message also including the message ID;
   publishing, by the server, the request message;
   subscribing, by the server, to a topic containing the response ID;
   receiving, by the server, a response message that includes the topic containing the response ID; and
   in response to receiving the response message, unsubscribing from the topic containing the response ID.

8. The method of claim 7, wherein the request message includes request data and the response message includes response data corresponding to the request data.

9. The method of claim 7, wherein the response ID is generated from the endpoint ID and the message ID using a one-way function.

10. The method of claim 9, wherein the one-way function is a hash function.

11. A computing system comprising:
    a server; and
    a plurality of endpoints;
    wherein, in response to publishing request messages intended for the plurality of endpoints, the server is configured to subscribe to topics containing response IDs that are generated from message IDs;
    wherein, in response to receiving the request messages, the plurality of endpoints are configured to publish response messages including the topics containing the responses IDs;
    wherein the server is configured to unsubscribe from the topics containing the response IDs upon receiving the response messages.

12. The computing system of claim 11, wherein the plurality of endpoints are configured to extract the message IDs from the request messages to generate the response IDs from the message IDs.

13. The computing system of claim 12, wherein the response IDs are generated from the message IDs and pre-agreed upon unique IDs.

14. The computing system of claim 12, wherein the message IDS are contained in payloads of the request messages.

15. The computing system of claim 13, wherein the response IDs are hashes of the unique IDs and the message IDs.

* * * * *